(12) United States Patent
Shingne et al.

(10) Patent No.: US 11,440,451 B2
(45) Date of Patent: Sep. 13, 2022

(54) ADJUSTABLE BACK AND LUMBAR SUPPORT

(71) Applicant: B/E Aerospace, Inc., Winston-Salem, NC (US)

(72) Inventors: Umesh B. Shingne, Hyderabad (IN); Shivaprasad Krishnamoorthy, Hyderabad (IN); Deepak Chandra Kokkalla, Hyderabad (IN)

(73) Assignee: B/E Aerospace, Inc., Winston-Salem, NC (US)

(*) Notice: Subject to any disclaimer, the term of this patent is extended or adjusted under 35 U.S.C. 154(b) by 0 days.

(21) Appl. No.: 17/217,102

(22) Filed: Mar. 30, 2021

(65) Prior Publication Data

US 2022/0072982 A1   Mar. 10, 2022

(30) Foreign Application Priority Data

Sep. 4, 2020   (IN) .............................. 202011038293

(51) Int. Cl.
*B60N 2/66*   (2006.01)
*B60N 2/02*   (2006.01)

(52) U.S. Cl.
CPC ........... *B60N 2/666* (2015.04); *B60N 2/0232* (2013.01)

(58) Field of Classification Search
CPC . B60N 2/666; B60N 2/66; B60N 2/64; B60N 2/0232; B60N 2/0224
USPC ..................................................... 297/284.7
See application file for complete search history.

(56) References Cited

U.S. PATENT DOCUMENTS

| 2,708,475 A | | 5/1955 | Krewson | |
|---|---|---|---|---|
| 4,711,492 A | * | 12/1987 | Asbjornsen | ............ A47C 7/402 297/284.7 |
| 5,112,106 A | * | 5/1992 | Asbjornsen | .............. A47C 7/46 297/284.7 |

(Continued)

FOREIGN PATENT DOCUMENTS

| DE | 102006012850 A1 | 9/2007 |
|---|---|---|
| EP | 1724148 A1 | 11/2006 |

(Continued)

OTHER PUBLICATIONS

Extended Search Report in European Application No. 21195115.7, dated Jan. 25, 2022, 9 pages.

*Primary Examiner* — Mark R Wendell
(74) *Attorney, Agent, or Firm* — Suiter Swantz pc llo

(57) ABSTRACT

A system is disclosed. The system includes a passenger seat. The passenger seat includes a seatback comprising one or more guide tracks and a headrest configured to couple to the seatback. The headrest includes a head portion and a lumbar portion. The lumbar portion is configured to separate from the head portion and translate to a lumbar portion of the seatback. The lumbar portion includes one or more brackets configured to slide along the one or more guide tracks. The passenger seat further includes a translation assembly mechanically coupled to the seatback and the lumbar portion. The translation assembly includes a cable coupled to the one or more brackets, wherein a movement of the cable corresponds to a translation of the lumbar portion. The translation assembly further includes a cable route. The translation assembly further includes one or more pulleys configured to guide the cable through the cable route.

16 Claims, 13 Drawing Sheets

(56) References Cited

U.S. PATENT DOCUMENTS

| | | | | |
|---|---|---|---|---|
| 5,335,965 A | * | 8/1994 | Sessini | A47C 7/425 |
| | | | | 297/284.4 |
| 5,567,011 A | * | 10/1996 | Sessini | B60N 2/0232 |
| | | | | 297/284.4 |
| 6,039,705 A | * | 3/2000 | Wu | A47C 7/46 |
| | | | | 601/100 |
| 8,840,182 B2 | | 9/2014 | Onji | |
| 8,973,994 B2 | | 3/2015 | Muck et al. | |
| 9,131,777 B2 | | 9/2015 | Muck | |
| 9,308,845 B2 | | 4/2016 | Cortellazzi | |
| 2008/0116731 A1 | | 5/2008 | Schurg et al. | |
| 2012/0256456 A1 | | 10/2012 | Nekrasov | |

FOREIGN PATENT DOCUMENTS

| | | |
|---|---|---|
| FR | 2469315 | 10/1981 |
| FR | 2855470 B1 | 7/2006 |
| KR | 101839782 B1 | 3/2018 |
| TW | 201320929 A | 6/2013 |
| WO | 2012057647 A1 | 5/2012 |

\* cited by examiner

ADJUSTABLE BACK AND LUMBAR SUPPORT

CROSS-REFERENCE TO RELATED APPLICATIONS

The present application claims the benefit under 35 U.S.C. § 119(e) of Indian Provisional Application Serial No. 202011038293 filed Sep. 4, 2020, which is hereby incorporated by reference in its entirety.

BACKGROUND

Aircraft passengers often feel fatigued during long flights, where prolonged sitting can lead to back pain. For many airlines, passenger seating is optimized for high density of passengers and low weight of passenger sets. These seats are often unable to provide back support, particularly adjustable back support, for passengers, increasing discomfort and/or back pain. Further, as airlines have become more hesitant to give pillows to passengers, the discomfort faced by passengers may be steadily worsening. Therefore, it would be advantageous to provide a solution that cures the shortcomings described above.

SUMMARY

A system is disclosed. In one or more embodiments, the system includes a passenger seat. The passenger seat includes a seatback comprising one or more guide tracks. The passenger seat further includes a headrest configured to couple to the seatback. The headrest includes a head portion and a lumbar portion. The lumbar portion is configured to separate from the head portion and translate to a lumbar portion of the seatback. The lumbar portion includes one or more brackets configured to slide along the one or more guide tracks. The passenger seat further includes a translation assembly mechanically coupled to the seatback and the lumbar portion. The translation assembly includes a cable coupled to the one or more brackets, wherein a movement of the cable corresponds to a translation of the lumbar portion. The translation assembly further includes a cable route. The translation assembly further includes one or more pulleys configured to guide the cable through the cable route. The system further includes a seat pan and one or more seat legs.

In some embodiments of the system, the translation assembly further comprises an actuator configured to actuate the cable through the cable route.

In some embodiments of the system, the actuator is an electric motor.

In some embodiments of the system, the actuator is a gas spring.

In some embodiments of the system, the translation assembly is operated manually.

In some embodiments of the system, the system further includes a lock configured to lock the lumbar portion into position.

In some embodiments of the system, the head portion is configured to translate vertically along the seatback.

In some embodiments of the system, the head portion and the lumbar portion are configured to appear as a single unit when the lumbar portion is disposed adjacent to the head portion.

A seatback is also disclosed. In one or more embodiments, the seatback includes a headrest. The headrest includes a head portion and a lumbar portion. The lumbar portion is configured to separate from the head portion and translate to a lumbar region of the seatback. The lumbar portion includes one or more brackets configured to slide along the one or more guide tracks. The seatback further includes a translation assembly mechanically coupled to the seatback and the lumbar portion. The translation assembly includes a cable coupled to one or more of the one or more brackets. Movement of the cable corresponds to a translation of the lumbar portion. The translation assembly further includes a cable route. The translation assembly further includes one or more pulleys configured to guide the cable through the cable route.

In some embodiments of the seatback, the translation assembly further includes an actuator configured to actuate the cable through the cable route.

In some embodiments of the seatback, the actuator is an electric motor.

In some embodiments of the seatback, the actuator is a gas spring.

In some embodiments of the seatback, the translation assembly is operated manually.

In some embodiments of the seatback, the seatback further includes a lock configured to lock the lumbar portion into position relative to the seatback.

In some embodiments of the seatback, the head portion is configured to translate vertically along the seatback.

In some embodiments of the seatback, the head portion and the lumbar portion are configured to appear as a single unit when the lumbar portion is disposed adjacent to the head position.

A method is also disclosed. In one or more embodiments, the method includes activating a translation assembly coupled to a lumbar portion of a headrest, wherein the headrest is coupled to a seatback of a passenger seat. The method further includes translating the lumbar portion of the headrest to a lumbar region of the seatback.

In some embodiments of the method, the translation assembly further includes an actuator configured to actuate a cable through a cable route, wherein the cable is coupled to the lumbar portion.

In some embodiments of the system, the actuator is an electric motor.

In some embodiments of the system, the translation assembly is operated manually.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1A:
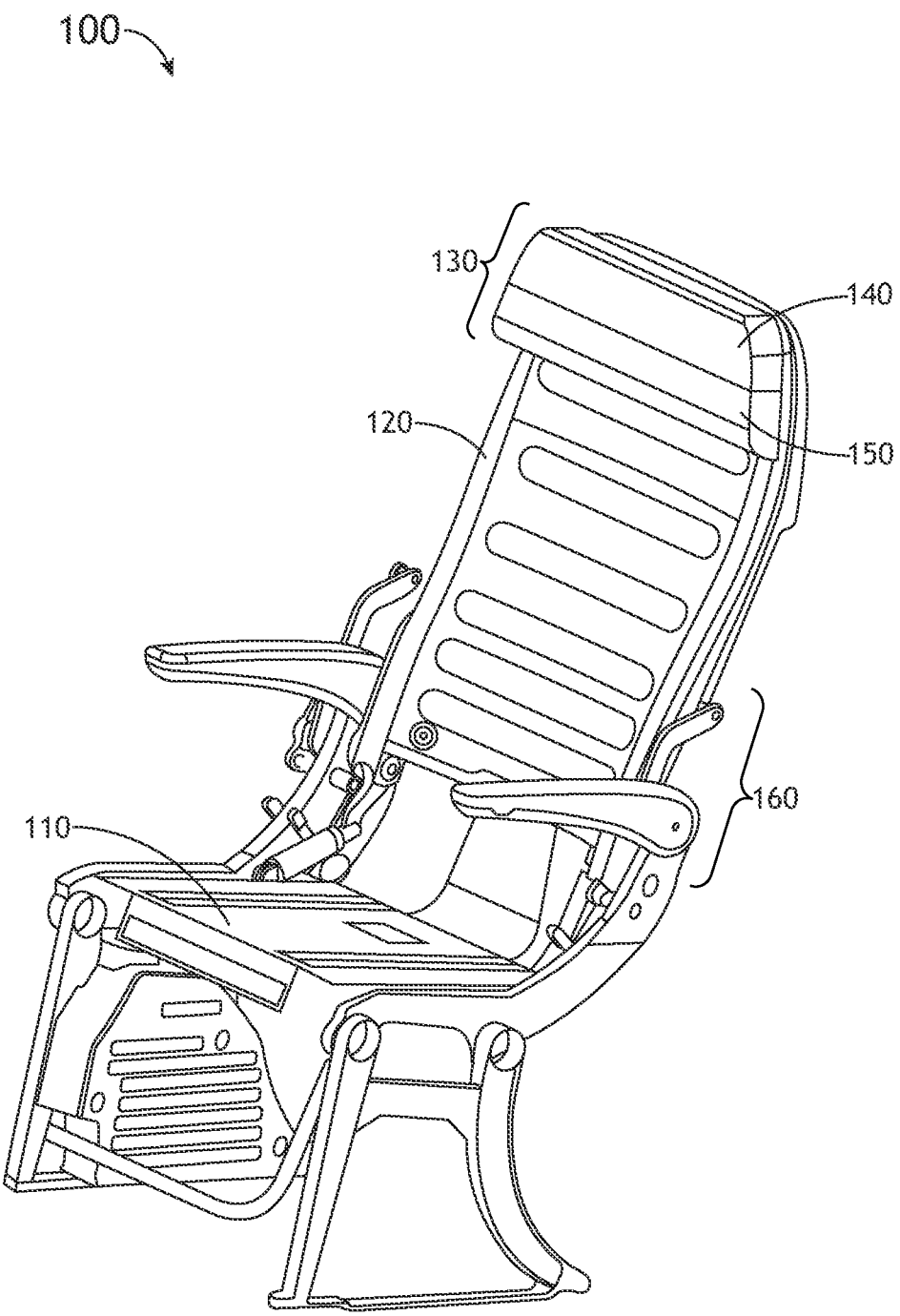
FIG. 1A illustrates a perspective view of a passenger seat, in accordance with one or more embodiments of this disclosure.
Figure 1B:
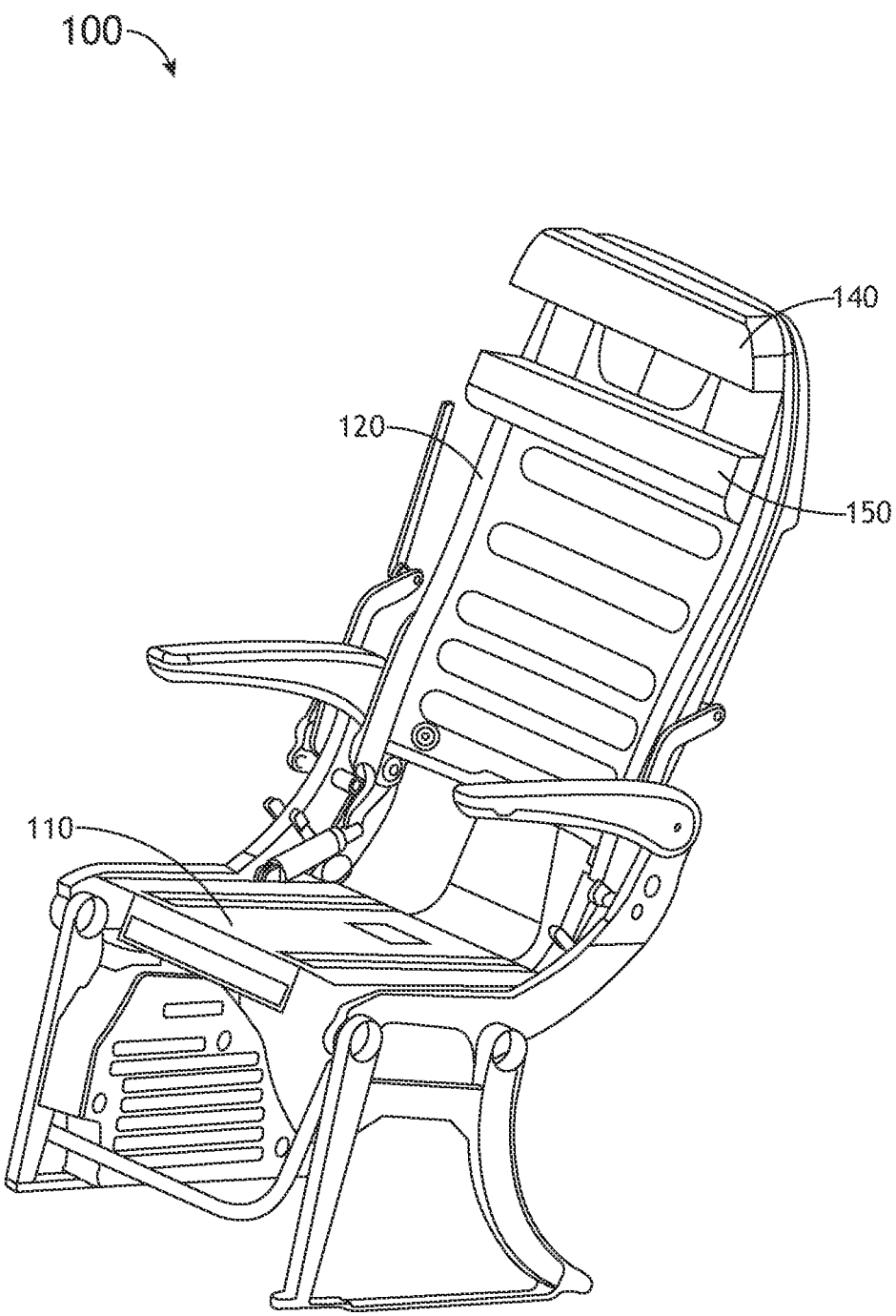
FIG. 1B illustrates a perspective view of a passenger seat, in accordance with one or more embodiments of this disclosure.
Figure 1C:
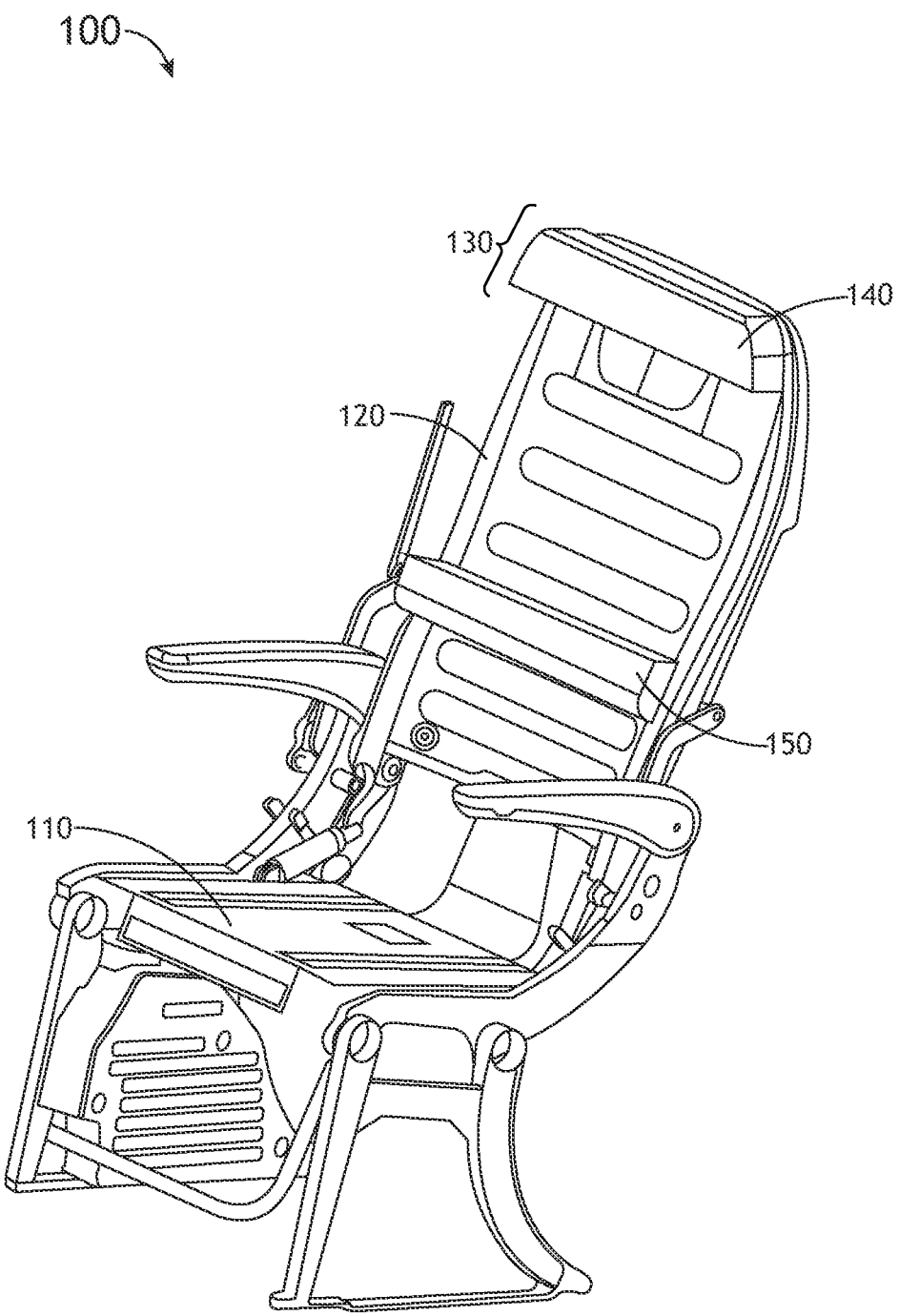
FIG. 1C illustrates a perspective view of a passenger seat, in accordance with one or more embodiments of this disclosure.
Figure 1D:
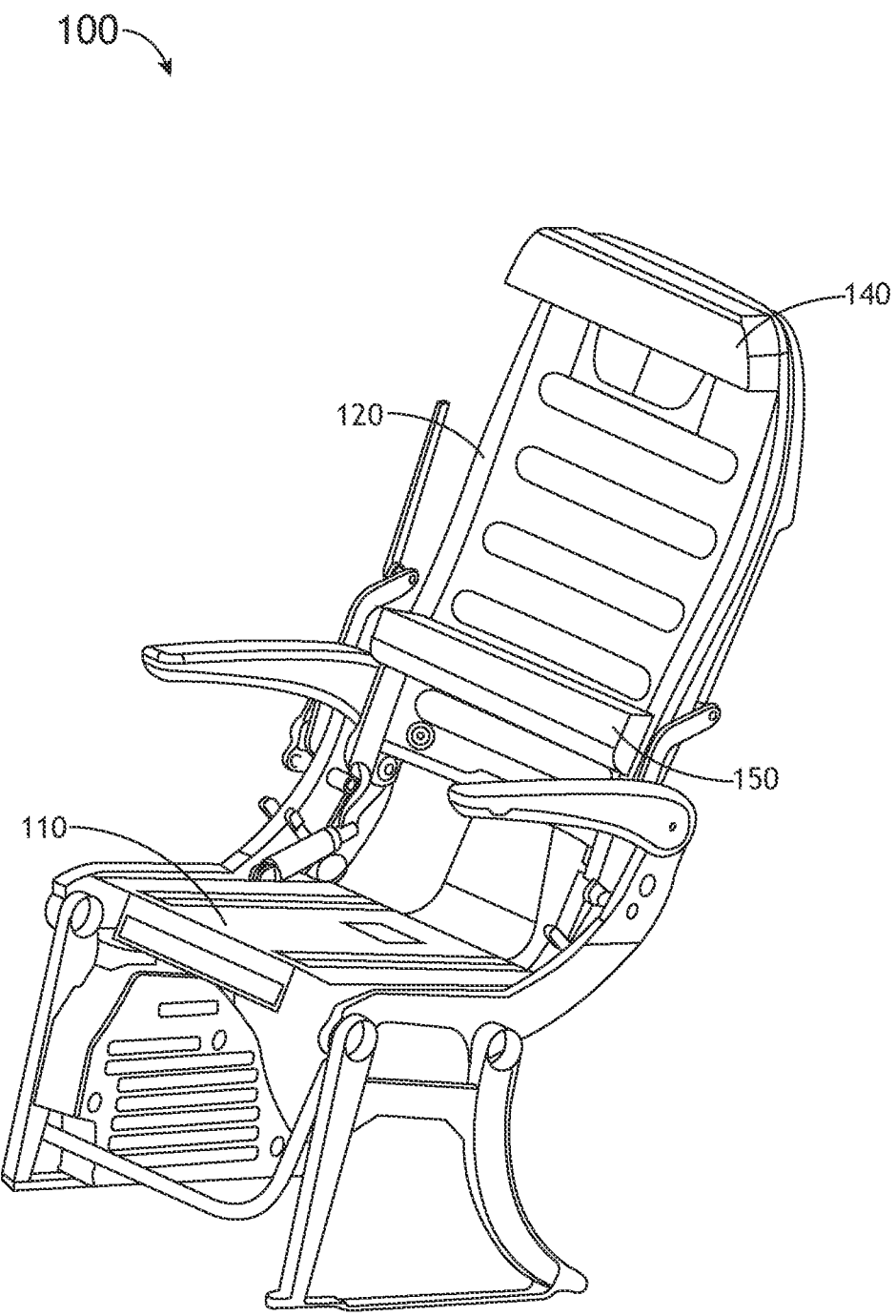
FIG. 1D illustrates a perspective view of a passenger seat, in accordance with one or more embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

Accordingly, embodiments of the present disclosure are directed to a system, apparatus, and method for a back and lumbar support within a passenger seat. The back and lumbar support is configured to translate between the headrest of the passenger seat to a position on a seatback of the passenger seat, allowing the passenger to adjust the lumbar support for comfort. The back and lumbar support may be configured so that when the back and lumbar support is raised to the highest position, the headrest and the back and lumbar support appear as a single unit. In other words, the headrest of the passenger seat may split into a head-piece and separate cushion that may be used as a back and lumbar support.

FIGS. 1A-1D illustrate perspective views of a passenger seat 100, in accordance with one or more embodiments of this disclosure. The passenger seat may be any seat known in the art. For example, the passenger seat 100 may be disposed within a vehicle. For instance, the passenger seat 100 may comprise an aircraft passenger seat. In another instance, the passenger seat 100 may comprise an automotive passenger seat. The passenger seat 100 may be considered part of a system (e.g., the system comprises the passenger seat 100).

The passenger seat 100 includes a seat pan 110, a seatback 120, and one or more seat legs 125. The seatback 120 may be configured to any size or shape. For example, the seatback 120 may be configured to fit an averaged sized adult. In another example, the seatback 120 may be configured to fit a child.

In embodiments, the passenger seat 100 includes a headrest 130 disposed upon the seatback 120. The headrest 130 may be of any size or shape. For example, the headrest 130 may be configured as a trapezoid. For instance, the headrest may be configured as an isosceles trapezoid. In another example, the headrest 130 may have an oval shape. In another example, the headrest 130 may have a rectangular shape.

In embodiments, the headrest 130 is divided into a head portion 140 and a lumbar portion 150. The head portion 140 of the headrest 130 is configured to be positioned at or near the head region of the seatback 120 (e.g., the region of the seatback 120 where the head of a passenger would normally rest against when the passenger is in a sitting position). The head portion 140 may be configured have no ability to translate or adjust relative to the seatback. For example, the head portion 140 may be configured to affix to the seatback via screws or other attachment means. Alternatively, in some embodiments, the head portion 140 is capable of translation relative to the seatback (e.g., translate vertically along the seatback). For example, the head portion may 140 may be configured to move or slide upwards and downwards along the length of the seatback 120.

In embodiments, the lumbar portion 150 is configured to translate from the head region of the seatback to the lumbar region 160 of the seatback (e.g., the region of the seatback 120 where the lumbar spinal region of the passenger would normally rest against when the passenger is in a sitting position). The lumbar portion 150 is configured to translate to any region of the seatback 120 from the head region to the lumbar region 160. For example, the lumbar portion 150 may remain disposed adjacent to the head portion 140 (e.g., as in FIG. 1A). In another example, the lumbar translate to a position relative to the cervical spinal region of a sitting passenger (e.g., as in FIG. 1B). In another example, the lumbar portion 150 may translate to a position relative to the upper lumbar region of a sitting passenger (e.g., as in FIG. 1C) In another example, the lumbar portion 150 may translate to a position relative to the lower lumbar region of a sitting passenger (e.g., as in FIG. 1D). The lumbar portion 150 is configured with a locking feature that allows the lumbar portion 150 to stay at a particular position designated by the user.

In some embodiments, the headrest 130 is configured to appear as if the head portion 140 and lumbar portion 150 of the headrest 130 are connected as a single unit (e.g., the head portion and lumbar portion are configured to appear as a single unit when the lumbar portion is disposed adjacent to the head portion, as shown in FIG. 1A). For example, the sides of the head portion 140 and lumbar portion 150 may be matched so that the there is a smooth transition from the head portion 140 to the lumbar portion 150 when the lumbar portion configured in the head region (e.g., default position). The matching of shape and other characteristics between the head portion 140 and the lumbar portion 150 may be aesthetically pleasing and allow the head of the passenger to comfortably press against both the head portion 140 and the lumbar portion 150 when the lumbar portion is configured in the head position (i.e., it is not obvious to the passenger that the headrest has two sections).

In embodiments, the headrest includes one or more characteristics indicating that the headrest 130 may be split into the head portion 140 and the lumbar portion 150. For example, the head portion 140 may have a colored differently than the lumbar portion 150. In another example, a label may be placed on the headrest 130 indicating that the head portion 140 and the lumbar portion 150 may be split. Any method to indicate that the headrest 130 may be split into the head portion 140 and lumbar portion 150 may be used. Therefore, the above description should not be interpreted as a limitation of the present disclosure, but merely an illustration.

Figure 2:
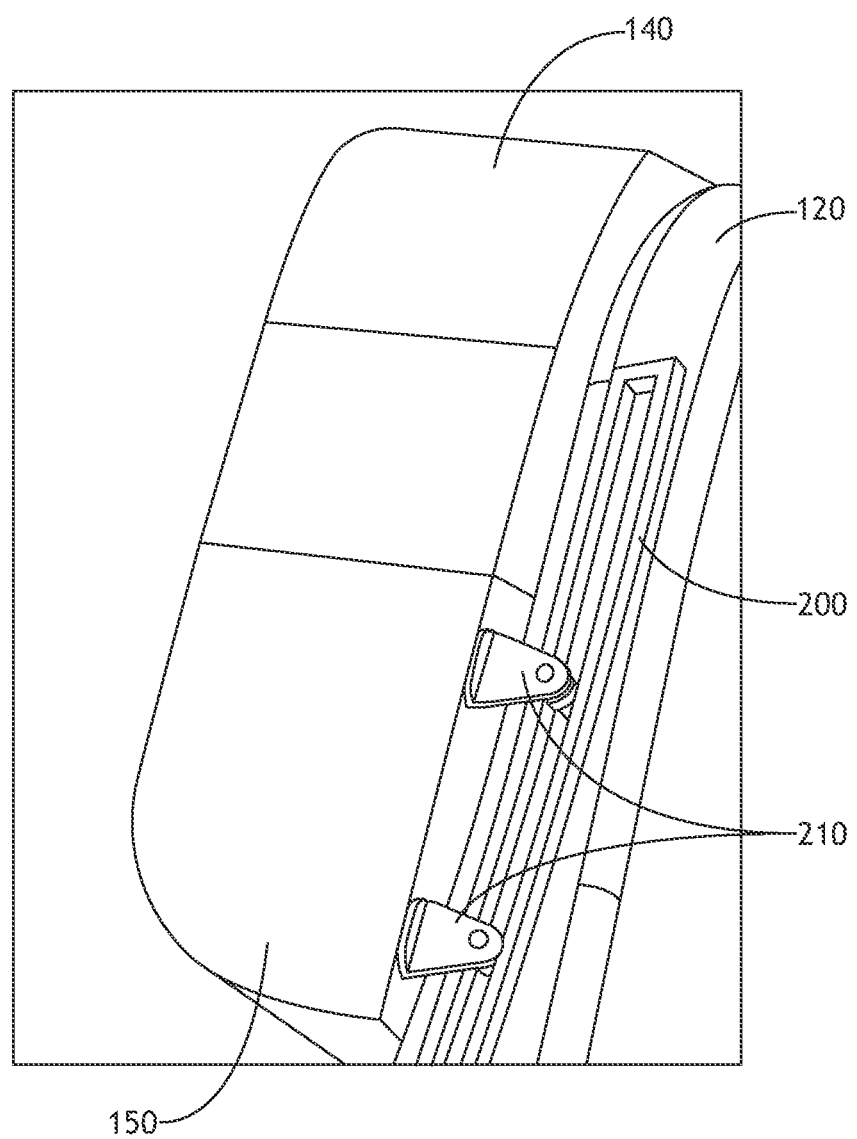
FIG. 2 illustrates a side view of a top portion of a seatback, in accordance with one or more embodiments of this disclosure.

FIG. 2 illustrates a closeup side view of the headrest 130 and a portion of the seatback 120, in accordance with one or more embodiments of this disclosure. In some embodiments, the seatback 120 includes one or more guide tracks 200 configured to couple to one or more brackets 210 attached to the lumbar portion 150. The combination of the brackets 210 with the guide tracks 200 allow the lumbar region to smoothly translate from the head region to the lumbar region 160. Any combination of bracket 210 and guide track 200 may be used. For example, the bracket 210 may be configured as a roller bracket that slides within a groove of the guide track 200. For instance, the bracket 210 and guide track 200 may comprise a rack and pinion. In another example, the bracket may be configured as a low friction stud that slides within the groove of the guide track. Any combination or configuration of guide track 200 and bracket 210 are possible. Therefore, the above description should not be interpreted as a limitation of the present disclosure, but merely an illustration.

Figure 3:
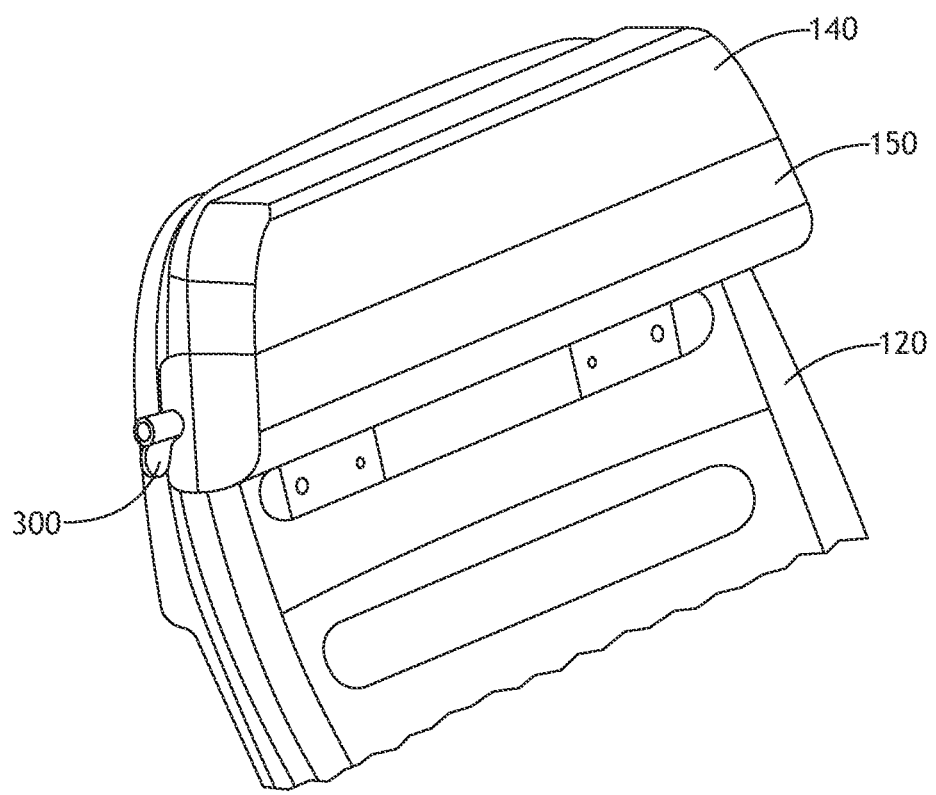
FIG. 3 illustrates a perspective view of a top portion of a seatback, in accordance with one or more embodiments of this disclosure.

FIG. 3 illustrates a perspective closeup view of the headrest 130 and a portion of the seatback, in accordance with one or more embodiments of this disclosure. In some embodiments, the seatback 120 includes a lock 300 coupled to the lumbar portion 150 configured to lock the lumbar portion 150 in a position (e.g., relative to the seatback) as desired by the user. The lock 300 may include any type of lock known. For example, the lock 300 may comprise a friction lock configured to press against the seatback 120 when activated, holding the lumbar portion in place. In another example, the lock 300 may comprise a cam or bolt that is inserted into the tooth of a guide track 200 configured as a rack, with the insertion of the cam or bolt holding the lumbar portion into place.

Figure 4:
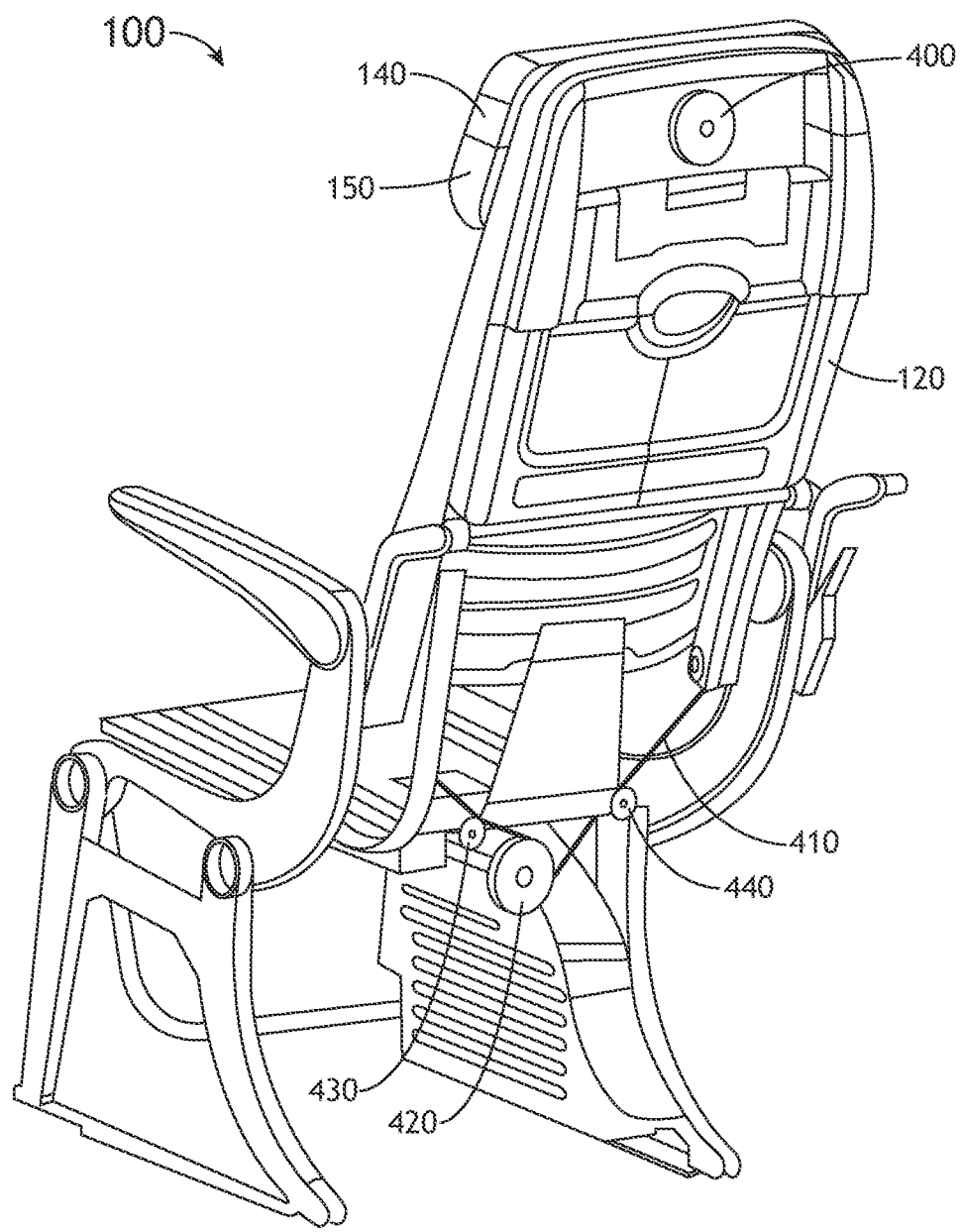
FIG. 4 illustrates a rear perspective view of a passenger seat, in accordance with one or more embodiments of this disclosure.

FIG. 4 illustrates a perspective view of the back of the passenger seat 100 in accordance with one or more embodiments of this disclosure. In some embodiments, the passenger seat includes a translation assembly. The translation assembly is coupled to the seatback 120 and is configured to facilitate the translation of the lumbar portion 150. The translation assembly may be configured to utilize manual and/or assisted force. For example, the translation assembly may be configured to allow a user to manually raise and/or lower the lumbar portion 150 by hand (e.g., the translation assembly has no power source, or has a power source, but still permits manual translation). In another example, the translation assembly may be configured to allow a user to raise and/or lower the lumbar portion 150 via an output device (e.g., a switch). In some embodiments, components of the translation assembly may be disposed on, or coupled to, the seat pan 110, or other components of the passenger seat 100. For example, the underside of the seat pan 110 may be affixed to a battery configured to power the translation assembly.

In some embodiments, the translation assembly includes a cable 410 that is laced through a cable route (e.g., shown with more clarity in FIG. X). The cable 410 may be any type of cable, rope, wire, chain, ribbon, or belt known. For example, the cable may be a nylon rope. In another example, the cable may be a coated steel cable. In another example, the cable may be a wire rope. The cable 410 is coupled to the one or more brackets 210 and configured such that movement of the cable 410 along the cable route also translates the brackets upward and/or downward the length of the seatback 120. The translation assembly also includes one or more pulleys, including a head region pulley 420 and a lumbar region pulley 430. The head region pulley and the lumbar region pulley are configured to facilitate the movement of the cable 410 through the cable route.

Figure 5:
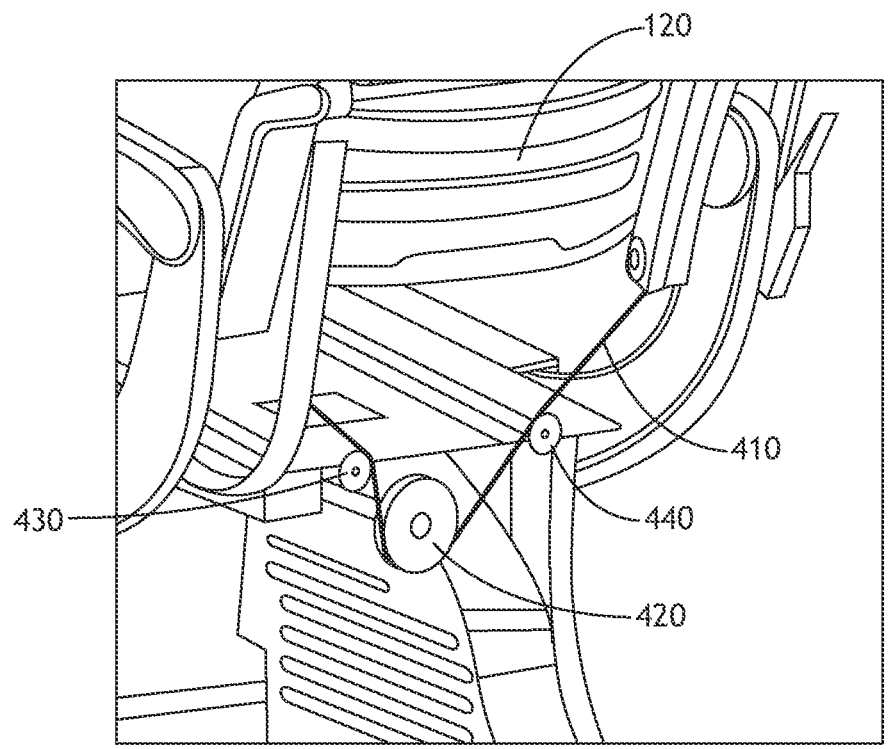
FIG. 5 illustrates a rear perspective view of lower portion of a seatback, in accordance with one or more embodiments of this disclosure.

FIG. 5 illustrates a closeup perspective view of the back of the passenger seat 100 in accordance with one or more embodiments of this disclosure. In some embodiments, the translation assembly includes one or more guide wheels 430, 440. The one or more guide wheels 430, 440, along with the head region pulley 420 and the lumbar region pulley 430 work to facilitate movement of the cable 410 around the cable route. Any number and type of pulleys and guider wheels 430, 440 may be used within the translation assembly. Therefore, the above description should not be interpreted as a limitation of the present disclosure, but merely an illustration.

Figure 6:
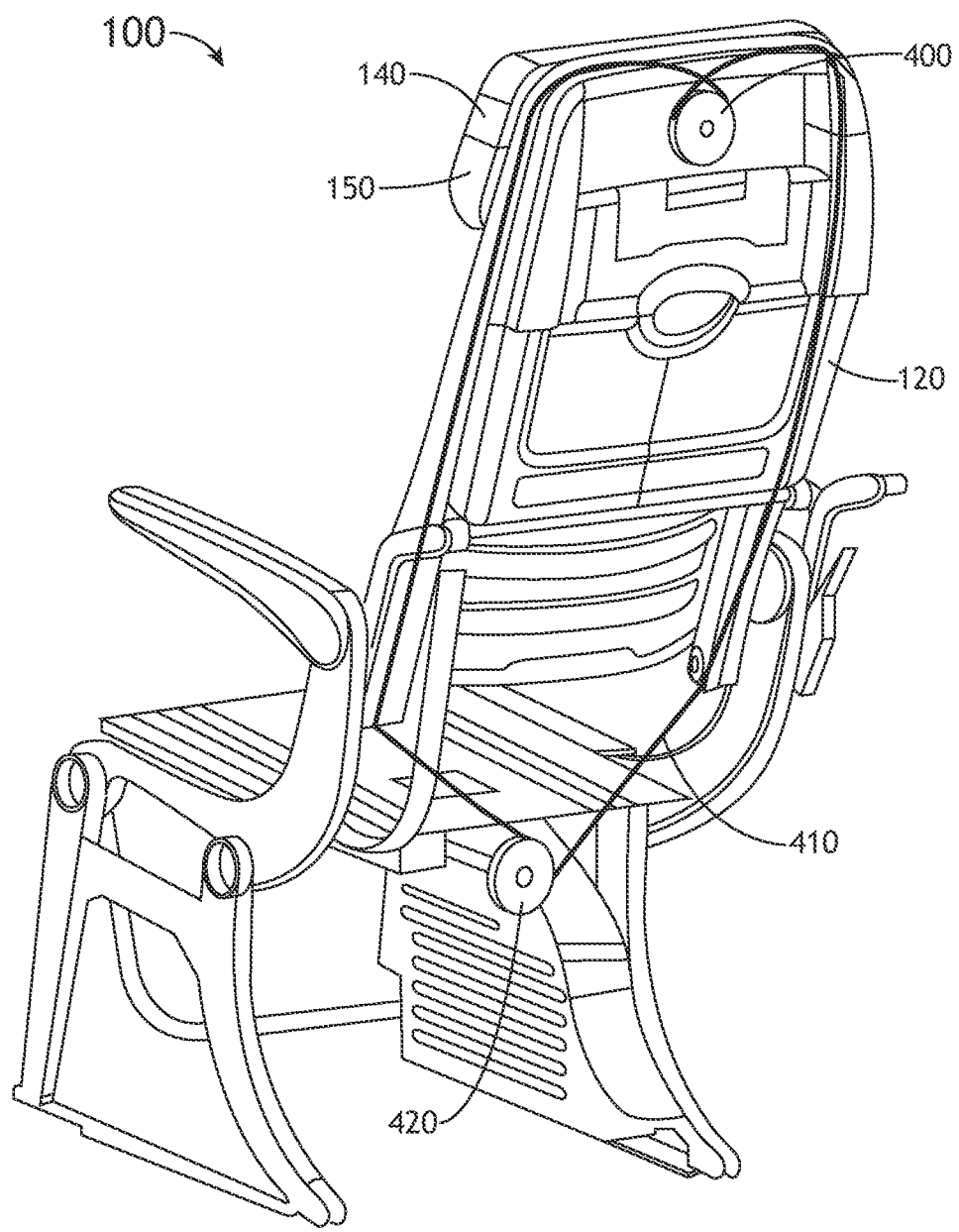
FIG. 6 illustrates a rear perspective view of a passenger seat, in accordance with one or more embodiments of this disclosure.

FIG. 6 illustrates a perspective view of the back of the passenger seat 100 in accordance with one or more embodiments of this disclosure. FIG. 6 presents in more detail the cable 410 as it is laced through the cable route. Movement of the cable 410 through the cable route translates the lumbar portion relative to the seatback 120.

Figure 7:
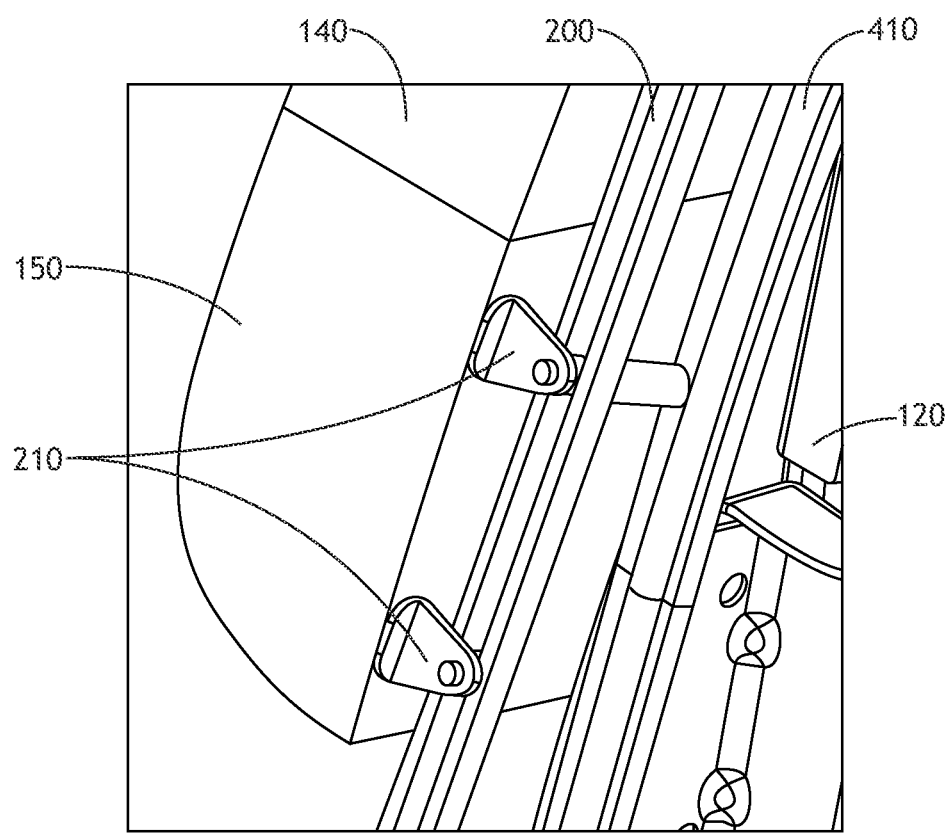
FIG. 7 illustrates a closeup view of a lumbar portion of a headrest coupled to a guide track of a seatback, in accordance with one or more embodiments of this disclosure.

FIG. 7 illustrates a closeup view of the lumbar portion 150 coupled to the guide track 200 and the cable 410 via the one or more brackets 210. For example, one of the one or more brackets 210 may comprise a shaft 700 configured to attach to the cable 410 The bracket 210, via the shaft 700, couples to the cable 410 and to the guide track 200, allowing a force applied to the cable 410 to be transferred to the lumbar portion 150, where the lumbar portion 150 translates a path constrained by the guide track 200.

Figure 8:
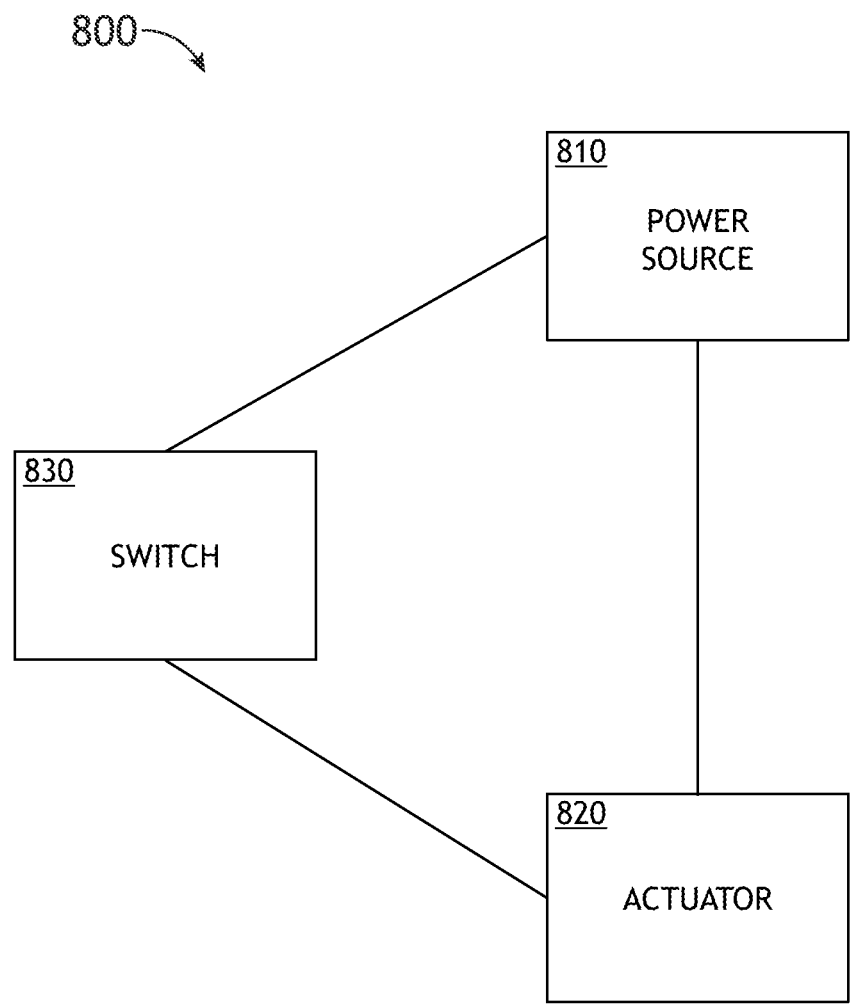
FIG. 8 is a block diagram illustrating electrical circuitry for a passenger seat, in accordance with one or more embodiments of this disclosure.

In some embodiments, the translation assembly is electrically controlled. FIG. 8 illustrates a block diagram of electrical circuitry 800 for controlling the translation assembly, in accordance with one or more embodiments of this disclosure. In some embodiments, the electrical circuitry 800 includes a power source 810. The power source 810 may be any power source 810 available. For example, the power source 810 may be the battery and/or related circuitry of the vehicle (e.g., an aircraft). In another example, the power source 810 may be a battery enclosed within the passenger seat.

The electrical circuitry 800 further includes an actuator 820. The actuator 820 delivers a motive force to the cable 410. For example, the actuator may be an electric motor. Any type of electric motor known may be used. For instance, the actuator may be a 12-volt gear motor, wherein a gear within the 12-volt motor is mechanically coupled to one or more pulleys or guide wheels 430, 400, pulling the cable 410 around the cable route. The electrical circuitry further includes a switch 830 to turn the actuator on and off, as well as to change direction of the translation of the lumbar portion 150 (e.g., to raise and/or lower the lumbar portion 150). The switch 830 may be disposed upon the passenger seat 100. Alternatively, the switch 830 may be placed outside of the passenger seat (e.g., for use by an attendant).

It should be known that non-electrical mechanisms for actuating the lumbar portion 150 via the translation assembly may be used. For example, the translation assembly may comprise a gas spring. For instance, the cable 410 may be mechanically coupled to the rod end fitting of a gas spring and configured so that the translation of the rod end fitting of the gas spring results in movement of the cable 410 and the lumbar portion. Other types of mechanisms may be used as well. Therefore, the above description should not be interpreted as a limitation of the present disclosure, but merely an illustration.

Figure 9:
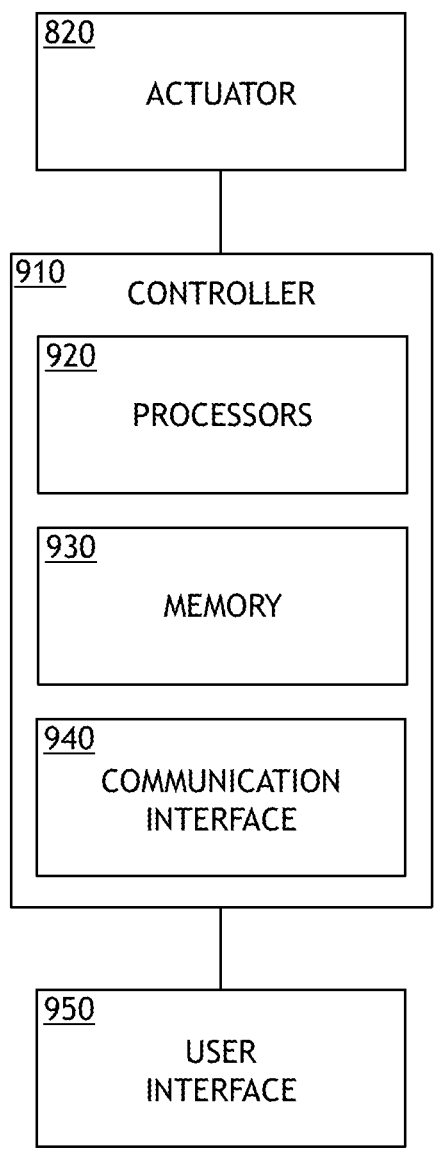
FIG. 9 is a block diagram illustrating a control system for a passenger seat, in accordance with one or more embodiments of this disclosure.

In some embodiments, the passenger seat includes a control system 900 (e.g., as shown in FIG. 9) configured to control the translation of the lumbar portion 150. The control system 900 may be a stand-alone system (e.g., only involved in translating the lumbar portion 150) or may be part of a control scheme to control other parts of the passenger seat and/or the passenger environment. For example, the control system 900 may be part of a scheme that includes control of reclining of the passenger seat. In another example, the control system 900 may be part of a scheme that includes control of the lighting near the passenger. For instance, the passenger seat may include a touch display configured for the user to control the brightness of a passenger light and the position of the lumbar portion 150.

The control system 900 includes the actuator 820 and a controller 910. The controller 910 being in communication with the actuator 820. The controller is configured to receive, process, and transmit data within the control system 900. The controller includes one or more processors configured to perform functions or steps according to program instructions stored in a memory 930. The controller 910 is further configured to include a communication interface 940. The communication interface 940 is configured to facilitate data transfer between components of the control system 900 and/or other components of the passenger seat 100.

The processors 920 may include any type of processing elements, including but not limited to integrated circuits (e.g., application specific integrated circuits (ASIC) and field programmable gate arrays (FPGA). The memory 930 may also include resident or external memory for storing data, executable code, and other resident or external memory generated by the control system 900. The controller 910 can execute one or more software programs embodied in a non-transitory computer readable medium (e.g., memory 930 that implement techniques described herein. In some embodiments, the controller 910 is not limited by the materials from which it is formed or the processing mechanisms employed therein and, as such, can be implemented via semiconductor(s) and/or transistors (e.g., using electronic integrated circuit (IC) components), and so forth.

The memory 930 can be an example of tangible, computer-readable storage medium that provides storage functionality to store various data and/or program code associated with operation of the passenger seat 100, the control system 900 and/or controller 910, such as software programs and/or code segments, or other data to instruct the controller 910, and possibly other components of the passenger seat 100, to perform the functionality described herein. Thus, the memory 930 can store data, such as a program of instructions for operating the controller 910 and other components of the control system 900 and/or passenger seat. It should be noted that while a single memory 930 is described, a wide variety of types of combinations of memory 930 (e.g., tangible, non-transitory memory) may be employed. The memory can be integral with the controller 910, can comprise stand-alone memory, or can be a combination of both. Some examples of the memory 930 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The communication interface 940 can be operatively configured to communicate with componentry within the controller 910, the control system 900 and/or the passenger seat 100. For example, the communication interface 940 may be configured to retrieve data from the controller 910, transmit data for storage in the memory 930, retrieve data from storage in the memory 930, and so forth. The communication interface 940 can also be communicatively coupled with the controller 910 to facilitate data transfer between components of the control system 900, the passenger seat 100 and/or the controller 910.

It should be noted that while the communication interface 940 is described as a component of the controller 910 and/or the control system 900, one or more components of the communication interface 940 may be implemented as external components communicatively coupled to control system 900 and/or the passenger seat 100 via a wired and/or wireless connection.

In embodiments, the control system 900 includes a user interface 950. The user interface 950 allows the control system 900 to communicate with a user. The user interface may include any type of tool or input device that allows a user to interact with the control system 900. For example, the control system 900 may include an input device including but not limited to buttons, switched, toggles, a keyboard, or a touchscreen display. In the case of a touchscreen display, those skilled in the art should recognize that a large number of touchscreen displays may be suitable for implementation in the present invention. For instance, the one or more displays may be integrated with a touchscreen interface, such as, but not limited to, a capacitive touchscreen, a resistive touchscreen, a surface acoustic based touchscreen, an infrared based touchscreen, or the like. In a general sense, any touchscreen display capable of integration with the display portion of a display device is suitable for implementation in the present invention. In embodiments, the user interface 950 is communicatively coupled to the controller 910. For example, the user interface 950, upon an input given by a user to lower the lumbar portion 150, will communicate the command to the controller 910 who sends further instructions to the actuator 820. The actuator 820, receiving input from the controller 910, lowers the lumbar portion 150 accordingly. The communication chain from user interface 950 to controller 910 to actuator 820 may be facilitate by a wired connection, a wireless connection, or a mixture of wired and wireless connections.

The ability of the control system 900 to control the actuator 820 via a user input may be expanded to beyond the passenger sitting within the passenger seat 100. For example, the user interface 950 may be configured as a mobile device used by a flight attendant, enabling the flight attendant to control one or more lumbar portions 150 for one or more passenger seats 100 within the aircraft. For instance, the flight attendant may raise the lumbar portion 150 for all passenger seats 100 in the aircraft during taxiing, take-off or landing (TTOL). Any configuration of user interface 950 with the passenger seat 100 is possible. Therefore, the above description should not be interpreted as a limitation of the present disclosure, but merely an illustration.

Figure 10:
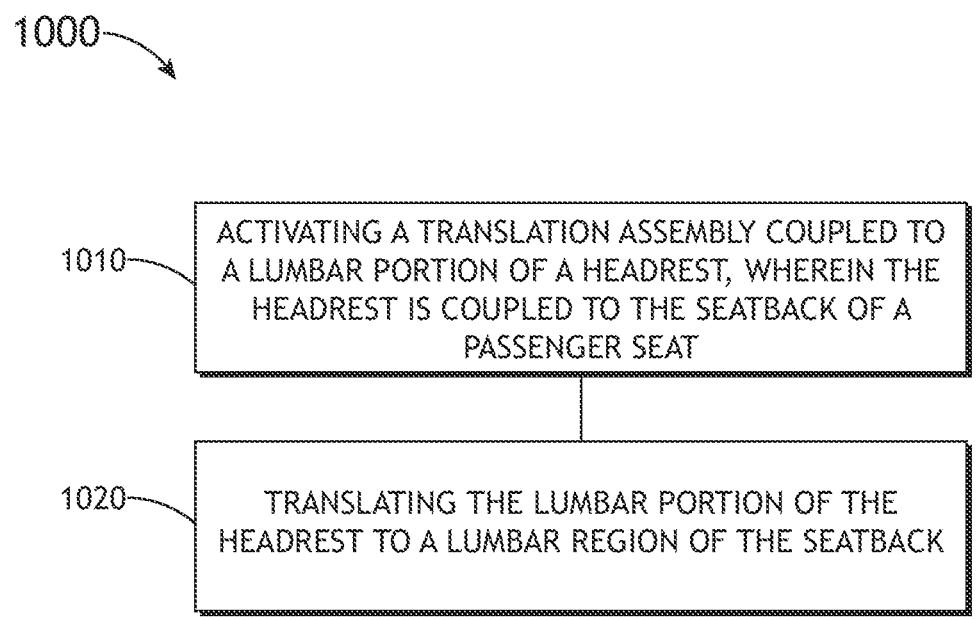
FIG. 10 is a flow diagram illustrating a method 1000 for the operation of the headrest 130, in accordance with one or more embodiments of this disclosure.

FIG. 10 is a flow diagram illustrating a method 1000 for the operation of the headrest 130, in accordance with one or more embodiments of this disclosure. In embodiments, the method 1000 includes a step 1010 of activating a translation assembly coupled to a lumbar portion of a headrest, wherein the headrest is coupled to a seatback of a passenger seat. For example, a switch may be turned-on, activating the translation assembly. In another example, an attendant may turn on the translation assembly by tapping an icon on an application on a mobile device that is communicatively coupled to the translation assembly. In another example, a passenger may begin to pull downward on the lumbar portion 150, activating the translation assembly.

In embodiments, the method 1000 further includes a step 1010 of translating the lumbar portion 150 of the headrest 130 to the lumbar region of the seatback. Once the lumbar portion 150 has been adjusted (e.g., translated) to the correct position, the lumbar portion 150 may be locked into place via the lock 300.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A system comprising:
    a passenger seat, wherein the passenger seat comprises:
    a seatback comprising one or more guide tracks;
    a headrest configured to couple to the seatback and having the appearance of a single cushion, comprising:
        a head portion; and
        a lumbar portion configured to separate from the head portion and translate to a lumbar region of the seatback, the lumbar portion comprising one or more brackets configured to slide along the one or more guide tracks;
    a translation assembly mechanically coupled to the seatback and the lumbar portion, comprising:
        a cable coupled to one or more of the one or more brackets, wherein a movement of the cable corresponds to a translation of the lumbar portion;
        a cable route; and
        two or more pulleys configured to guide the cable through the cable route including:
            a lumbar region pulley disposed inferior to the lumbar region; and
            a head region pulley disposed superior to the lumbar region and lateral or superior to the head portion;
    a seat pan; and
    one or more seat legs.

2. The system of claim 1, wherein the translation assembly further comprises an actuator configured to actuate the cable through the cable route.

3. The system of claim 2, wherein the actuator is an electric motor.

4. The system of claim 2, wherein the actuator is a gas spring.

5. The system of claim 1, wherein the translation assembly is operated manually.

6. The system of claim 1, further comprising a lock configured to lock the lumbar portion into position relative to the seatback.

7. The system of claim 1, wherein the head portion is configured to translate vertically along the seatback.

8. The system of claim 1, wherein the head portion and the lumbar portion are configured to appear as a single unit when the lumbar portion is disposed adjacent to the head portion.

9. A seatback comprising:
    one or more guide tracks;
    a headrest comprising:
        a head portion;

a lumbar portion configured to separate from the head portion and translate to a lumbar region of the seatback, the lumbar portion comprising one or more brackets configured to slide along the one or more guide tracks; and a translation assembly mechanically coupled to the seatback and the lumbar portion, comprising:

a cable coupled to one or more of the one or more brackets, wherein a movement of the cable corresponds to a translation of the lumbar portion; and a cable route; and two or more pulleys configured to guide the cable through the cable route including:

a lumbar region pulley disposed inferior to the lumbar region; and a head region pulley disposed superior to the lumbar region and lateral or superior to the head portion.

10. The seatback of claim 9, wherein the translation assembly further comprises an actuator configured to actuate the cable through the cable route.

11. The seatback of claim 10, wherein the actuator is an electric motor.

12. The seatback of claim 10, wherein the actuator is a gas spring.

13. The seatback of claim 9, wherein the translation assembly is operated manually.

14. The seatback of claim 9, further comprising a lock configured to lock the lumbar portion into position relative to the seatback.

15. The seatback of claim 9, wherein the head portion is configured to translate vertically along the seatback.

16. The seatback of claim 9, wherein the head portion and the lumbar portion are configured to appear as a single unit when the lumbar portion is disposed adjacent to the head portion.

* * * * *